Aug. 25, 1964   E. N. YEARY   3,146,017
VEHICLE FOR ENCLOSING AND CARRYING DIVERSE FORMS OF CARGO
Filed April 29, 1963   4 Sheets-Sheet 1
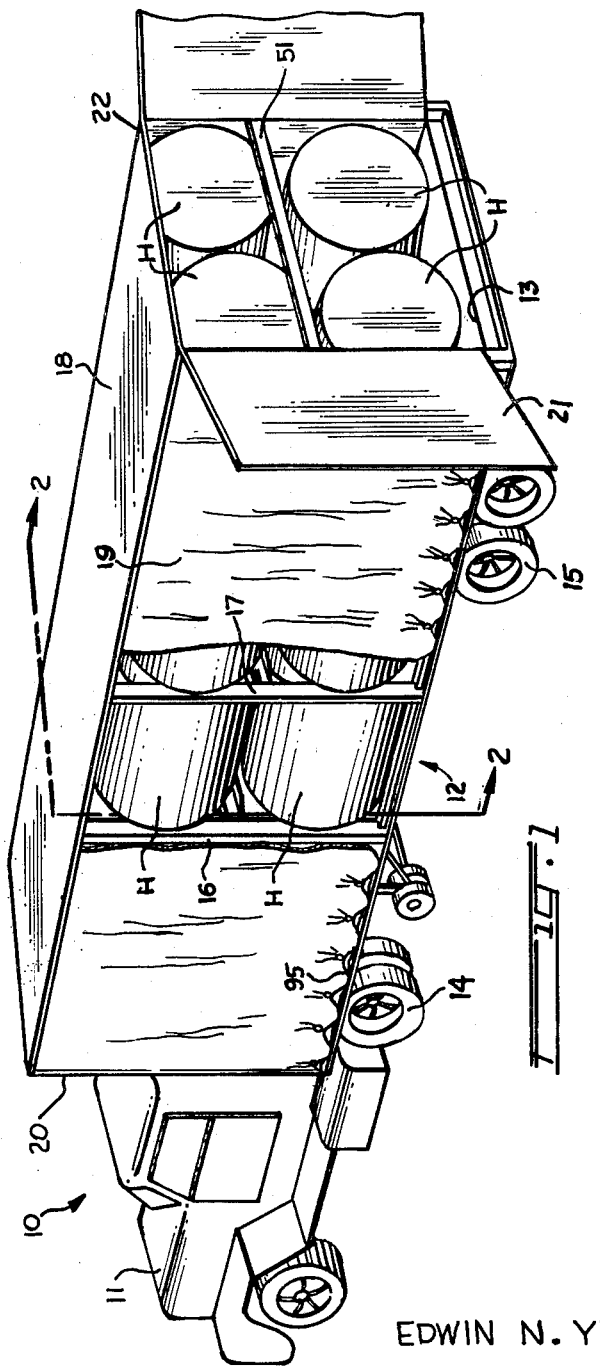
INVENTOR
EDWIN N. YEARY
BY W. E. Sherwood
ATTORNEY

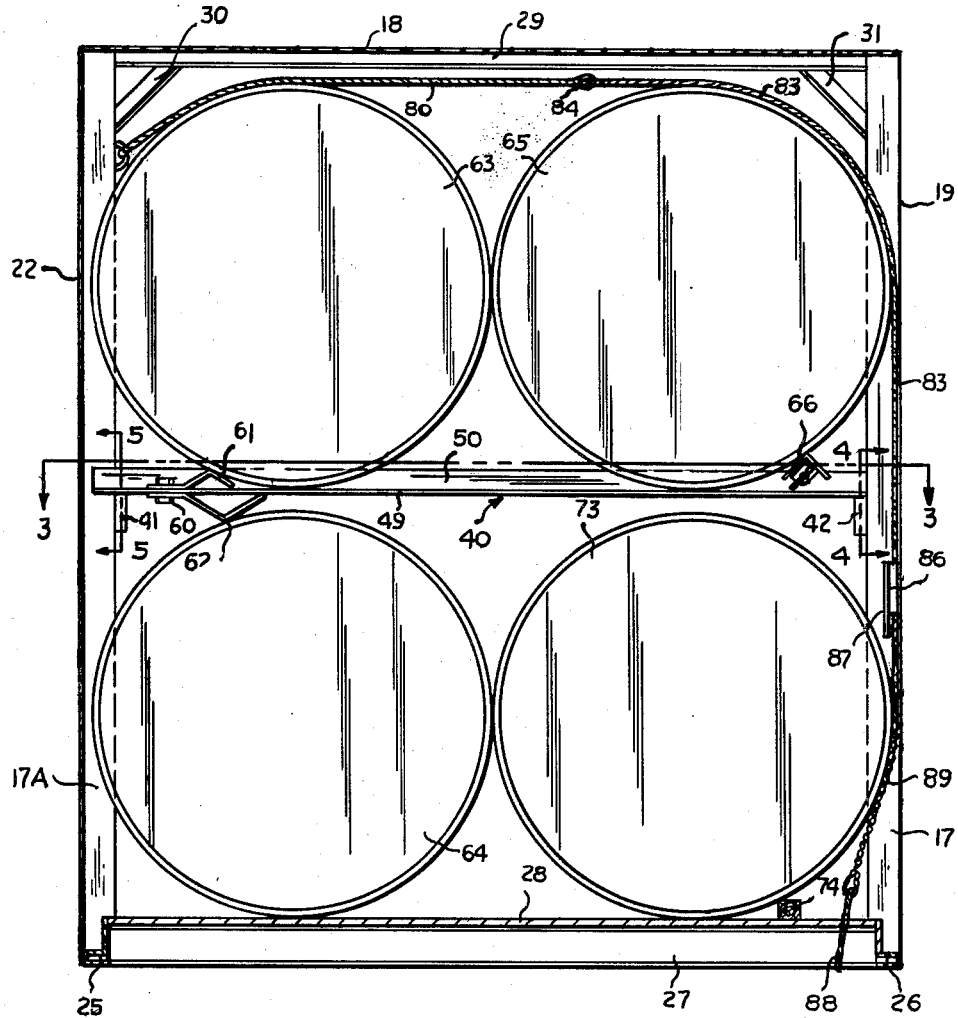
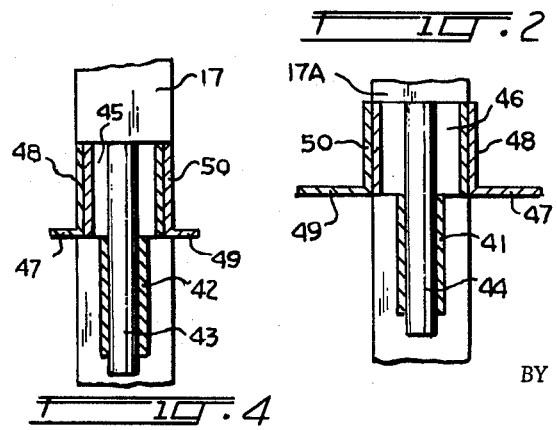

Aug. 25, 1964  E. N. YEARY  3,146,017
VEHICLE FOR ENCLOSING AND CARRYING DIVERSE FORMS OF CARGO
Filed April 29, 1963  4 Sheets-Sheet 3
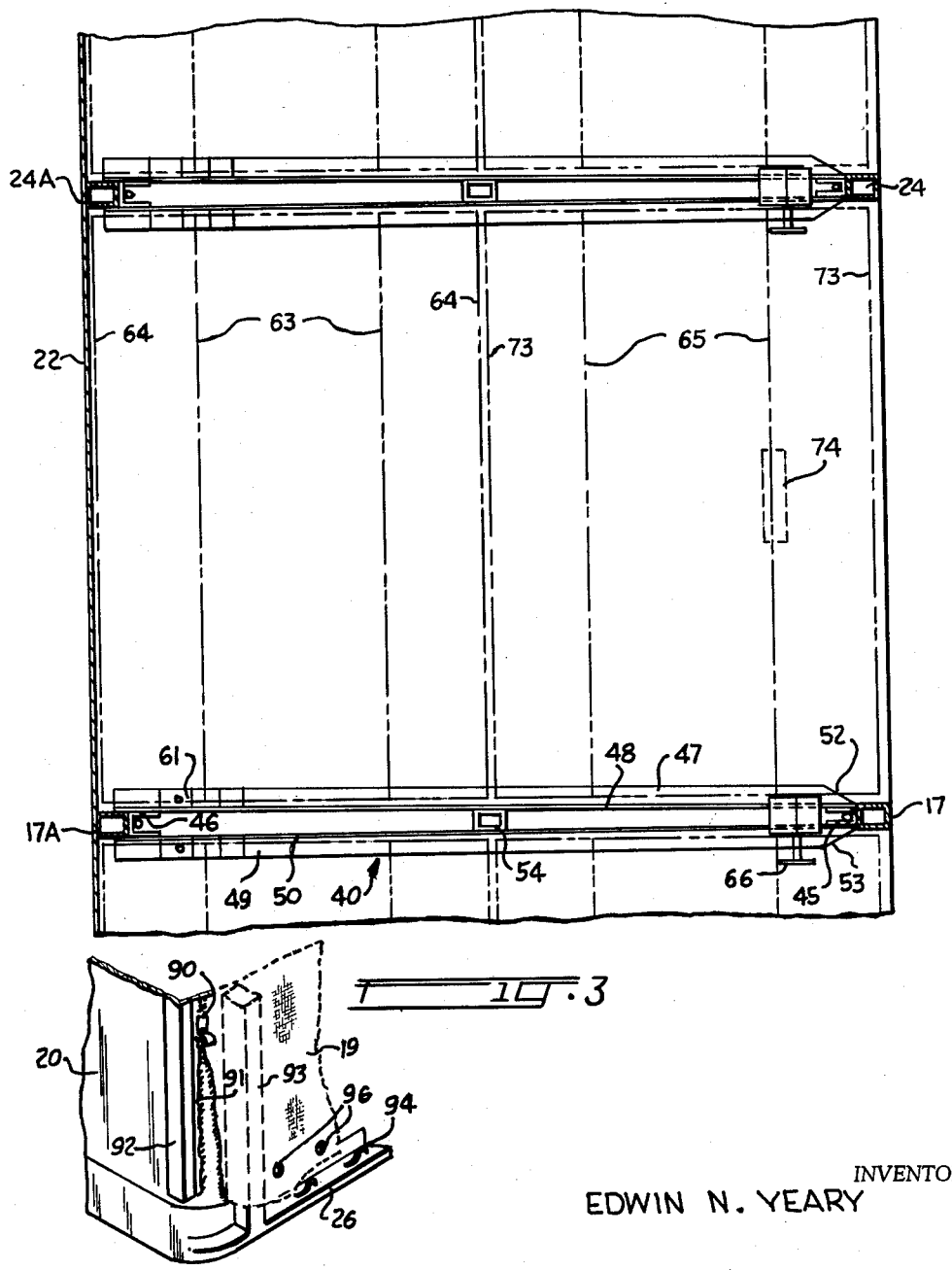
INVENTOR
EDWIN N. YEARY
BY  W. E. Sherwood
ATTORNEY

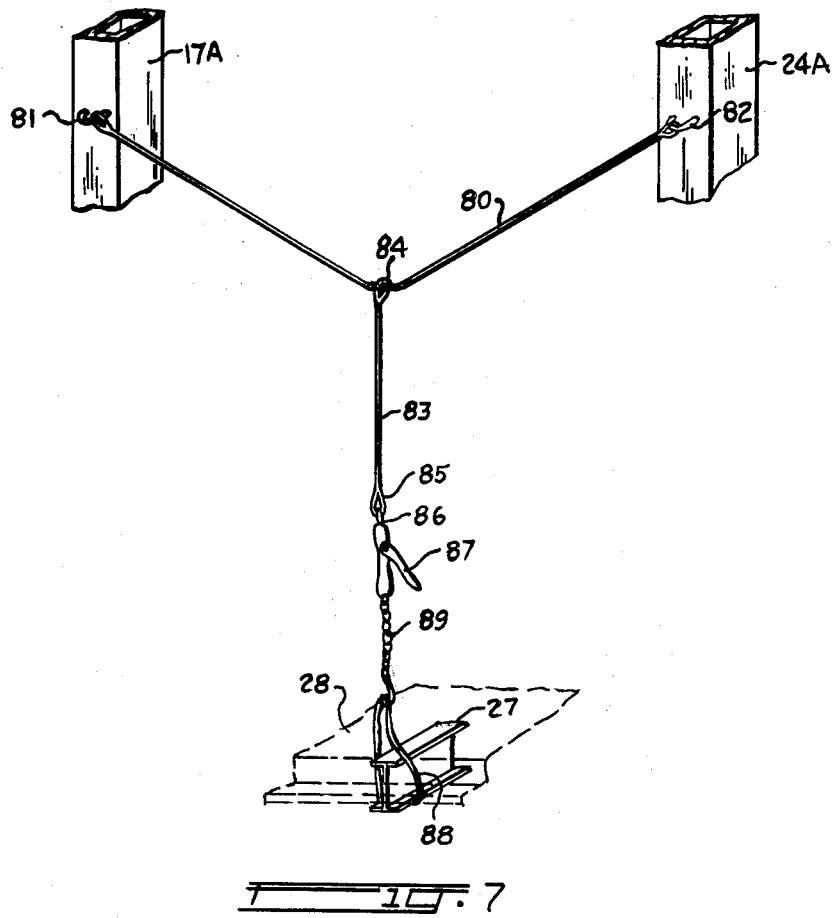
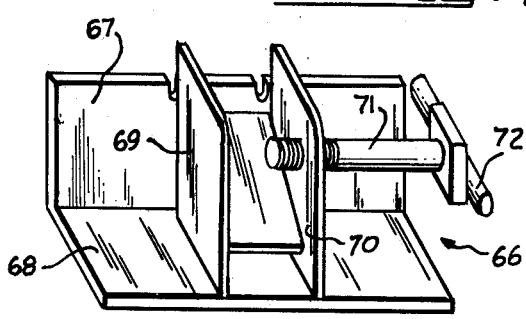

United States Patent Office 3,146,017
Patented Aug. 25, 1964

3,146,017
VEHICLE FOR ENCLOSING AND CARRYING DIVERSE FORMS OF CARGO
Edwin N. Yeary, Lexington, Ky., assignor to Yeary Transfer Company, Inc., Winchester, Ky., a corporation of Kentucky
Filed Apr. 29, 1963, Ser. No. 276,370
5 Claims. (Cl. 296—4)

This invention relates to an improved vehicular body construction, and particularly to a vehicle which may be readily loaded and unloaded, and which is capable of carrying side-loaded cylindrical articles as one form of cargo.

By way of illustration, and not of limitation, the invention is disclosed in the form of a vehicle which is intended to carry loaded tobacco hogsheads on one part of its journey and which, after unloading of the hogsheads, may then be employed for carrying enclosed general purpose cargo during another portion of its journey. The transporting of loaded tobacco hogsheads on flat-bed vehicles traditionally has entailed the supporting of the upper tier of the same in contact with either the lower tier or with a sheet of material which is interposed between the hogsheads of the two tiers. Suitable chocks and lashing means are normally used to keep the hogsheads from rolling, and then a flexible cover, such as a large tarpaulin is fastened in place to protect the hogsheads against the weather. However, after the flat-bed vehicle is unloaded, it frequently is unsuitable for carrying, on its return journey, a different form of cargo which requires more effective protection than do the massive hogsheads. It is a purpose of the invention, therefore, to overcome these limitations and to enable the user of the vehicle to make a more effective use of the same.

An object of the invention is to provide a vehicle for optionally carrying heavy cylindrical articles or general purpose cargo, and for affording adequate protection against weather or pilferage, regardless of the cargo being carried.

Another object is to provide an improved cargo vehicle for side loading and unloading of cylindrical articles by rapidly and efficiently rolling the same into the desired locations.

Another object is to provide an improved cargo vehicle for handling of loaded tobacco hogsheads with a minimum of damage thereto during loading, transporting and unloading of the same.

Other objects and advantages will become more apparent as the description proceeds and when considered in conjunction with the accompanying drawings, in which:

FIG. 1 is a perspective view of a loaded vehicle embodying the invention and with portions broken away.

FIG. 2 is a sectional view to a larger scale taken on line 2—2 of FIG. 1 and with the hogsheads shown in elevation.

FIG. 3 is a partial sectional view taken on line 3—3 of FIG. 2 and showing the edges of the hogsheads in dotted lines.

FIG. 4 is a detail view of the beam support taken on line 4—4 of FIG. 2.

FIG. 5 is a detail view of the beam support taken on line 5—5 of FIG. 2.

FIG. 6 is a perspective view of a detachable chock for use with the load-supporting beams.

FIG. 7 is a diagrammatic view indicating one arrangement for retaining the hogsheads in place following loading of the same, and FIG. 8 is a detail in perspective of the lower front corner of the vehicle showing a slide fastener arrangement for securing the front edge of the flexible siding of the vehicle.

Referring first to FIG. 1, a primary capability of the present invention is indicated by the tractor-trailer combination shown generally at 10 and loaded with cylindrical articles such as tobacco hogsheads H. A conventional tractor 11 for hauling the trailer 12 having an improved superstructure, later to be described, is detachably joined to the trailer so that the latter may be hauled by other modes of transportation, as by "piggy-back" movement on railway flat cars, when the tractor is detached therefrom. The trailer comprises essentially a flat-bed frame 13 with a mobile support therefor, including the wheels 14 and 15 respectively of the tractor and trailer. A plurality of pairs of vertical posts or uprights, two of which are shown at 16, 17 (FIG. 1) are arranged along the respective sides of the frame and support at their top ends a rigid roof 18 to which is attached on a second side of the vehicle a withdrawable flexible cover 19. A rigid front end wall 20 and a conventional door 21 serving as a rear end wall likewise are provided, and for completing the enclosure a rigid first side wall 22 is mounted upon the uprights on the side of the vehicle opposite the side from which loading and unloading of the cylindrical articles is to take place.

Passing now to FIGS. 2 and 3, the bed frame comprises a rectangular, elongated structure having side members 25, 26 rigidly secured to cross braces 27 and with a suitable flooring 28 superimposed on those cross braces. Securely welded or otherwise permanently secured at their lower ends to the side members are pairs of uprights, two of which are shown at 17, 17A and 24, 24A in FIG. 3 and at their upper ends these uprights are rigidly secured to corresponding joists supporting the roof, one such joist being shown at 29 in FIG. 2 and with the joist and uprights being braced as by members 30 and 31. The rearmost joist and pair of uprights serve as a framing for suspension of rear door 21 while the forwardmost joist and pair of uprights serve as a framing for the stationary closed front end wall 20. In addition, the uprights along one side of the vehicle serve as a support for the stationary first side wall 22.

The spacing between uprights along each side of the vehicle is uniform and is determined by the axial dimension of the cylindrical article to be carried, in the case of standard tobacco hogsheads this dimension being approximately fifty-four inches. Other equivalent articles, such as rolls of paper, constituting the primary cargo for which a given vehicle is intended, may be transported, but in any event the spacing between adjacent uprights is such as to permit the use of conventional forklift trucks and the like when side loading or unloading is to be accomplished.

As a significant feature of the invention, the primary cargo is carried in upper and lower tiers and normally will occupy the maximum available space within the confines of the superstructure of the vehicle. As best shown in FIG. 2 the outer peripheral edges of the cylindrical articles intersect the planes of the inner edges of the uprights and if any longitudinal shifting of the articles should tend to take place, as when the vehicle is traveling on a steep hill, the uprights will prevent undue shifting from occurring, this feature being especially important as regards the lower tier of articles.

For the purpose of supporting the upper tier of articles out of contact with the lower tier, the novel load-supporting beams now to be described are provided. As is known, tobacco hogsheads when filled, may weigh in the order of 1000 pounds and are often constructed of plywood, metal sheets, plastic sheets or the like in a knock-down form with hoops intermediate the ends. The structural strength of the hogshead is located largely at the ends where strong bands encompass the periphery and enclose rather thick end disc members, and thus the hogshead is well adapted for cradled support at its ends. My invention takes advantage of this feature and accordingly I provide beams such as generally shown at 40 in FIGS. 2 and 3 which contribute not only to rapid loading and unloading of the hogshead but also to secure stowing of the same.

Rigidly attached to the inner faces of the uprights at approximately half of their height are hollow brackets 41 and 42 which may comprise tubes welded on the side to the uprights and adapted to receive downwardly directed pintle pins 43 and 44 respectively, which in turn are rigidly affixed to the beam adjacent its ends. These beams include a pair of angle iron rail portions joined adjacent their ends by pads 45 and 46 to which the pintle pins are attached. The rail portion facing the rear of the vehicle comprises a horizontal flange 47 having a width sufficient to receive the hoop at the end of the hogshead and to leave a clearance of about one inch between that hoop and the vertical flange 48 of the same rail portion as the hogshead is rolled to and from stowed position on the rail. Similarly, the rail portion facing the front of the vehicle comprises a horizontal flange 49 and a vertical flange 50. As will be appreciated, the rearmost beam 51 shown in FIG. 1 and the corresponding forwardmost beam in the vehicle are suitably modified to provide only a single rail portion, but in any event each beam in the vehicle will have an angularly flanged rail portion confronting the rail portion of the next adjacent beam. In order to enable the cylindrical article to be rolled on and off the beams without damage to the article, the end of the rail portion or portions of the beams adjacent the loading side of the vehicle are beveled, as best seen at 52, 53 in FIG. 3 and the pad 45 constitutes the extreme end of the beam on that loading side, thus to permit ready lifting of the beam from the supporting upright when a different form of a cargo is to be carried in the vehicle. Preferably, but not necessarily, the two rail portions of the central beams are distinct members being joined to each other by the pads 45 and 46 and by a central spacer 54 (FIG. 3). By means of this arrangement the extreme ends of the rail portions may extend as a bifurcated member embracing the upright 17A and providing a more rigid structure for withstanding the loads imposed by the hogsheads in case they tend to shift longitudinally. Since, however, the opposite bevelled end of the beam does not embrace the opposite upright 17, this reinforcing feature does not detract from the ready detachability of the beam from the uprights.

In addition, to having a width sufficient to support the end of the hogshead, the horizontal flanges of the beams also are wide enough to mount as by one or more bolts 60, an upper permanent chock 61 and a lower permanent chock 62 for limiting the leftward movement of hogsheads 63 and 64 respectively, as seen in FIG. 2. For securing hogshead 65 of the upper tier in place, a special detachable chock 66 as best seen in FIGS. 2 and 6 is provided. This device comprises a pair of plates 67, 68 normal to each other and joined along one edge. Extending normal to the attached plates and on the inner faces thereof is a pair of parallel plates 69, 70 spaced from each other a sufficient distance to embrace therebetween the vertical flanges 48 and 50 of the load-supporting beam. Passing through a threaded hole in one of the parallel plates is a manually adjustable screw 71 having a handle 72 by means of which the device may be tightened in place at a selected point along the beam, thereby to chock the upper hogshead 65 in place. Normally the second hogshead 73 in the lower tier is retained in place by means of a single chock 74 which may be suitably secured to the bed 28 of the frame by a nail or equivalent means.

As a further safeguard to secure the hogsheads in place, I provide a retaining means as best shown in FIGS. 2 and 7 and comprising a cable 80 anchored at its ends 81 and 82 to adjacent uprights 17A and 24A near the roof of the vehicle. A second cable 83 having a bight 84 therein slidable along cable 80 carries at its lower end another bight 85 into which a hook 86 of a manually operable wire-stretcher-like tensioning means 87 is adapted to engage for pulling the cables taut against the hogsheads 63, 65, and 73 in the manner shown in FIG. 2. This arrangement includes a loop 88 embracing one of the cross braces 27 beneath the floor of the vehicle and passing through a hole in the floor 28. A short section 89 of flexible chain or the like joins the loops to the manually operable tensioning means whose hook is detachably engageable in the bight 85 of the slidable cable. Accordingly, when placed under tension the several parts bear jointly against the sides of hogsheads in the upper and lower tiers which are located at the loading side of the vehicle and thus assist the chocks in preventing any rolling movement toward the side of the vehicle on which the relatively weak flexible siding is located.

Considering now FIGS. 1, 2, and 8, when the vehicle is loaded either with primary cargo in the form of the above-described cylindrical articles or with other forms of cargo, the door 21 is closed and locked and the flexible siding is pulled into place. This siding comprises a single piece of weather-resistant material such as a thick plastic, canvas or the like which is permanently fastened along its upper edge to the eave of roof 18 and which carries a pair of conventional slide fasteners at its vertical edges. As seen in FIG. 8, the front slide fastener 90 engages with a permanently fixed flexible vertical strip 91 which underlies a vertical wind and rain deflector 92 attached to the arcuate corner of the front wall 20 in advance of the forwardmost upright 93 of the vehicle bed. Disposed rearwardly along the side member 26 are hooks or the like 94, for receiving a lower edge lashing means 95 (FIG. 1) passing through those hooks and through grommets 96 along the lower edge of the siding. A similar slide fastener (not shown) serves to join the rear vertical edge of the flexible siding to the framing for the rear door and when both sliding fasteners are in their lowermost position and with the lower edge of the siding lashed in place the cargo of the vehicle accordingly is fully enclosed and protected.

The flexible wall 19 normally will be withdrawn from its covering position by being lifted or rolled upwardly to a rest position on the top of roof 18. When moving the vehicle piggyback on a railway car it is anticipated that conventional shipping seals will be applied both to the door 21 and to the lashed-in-place siding.

Having thus described a preferred form of the invention, various advantages of the same will be apparent to those skilled in the art. The vehicle is constructed, of course, with uprights spaced according to the primary load to be carried and this cargo, when constituting cylindrical articles, is brought by fork-lift trucks, or by means of ramps, into position where it can be rolled onto the floor 28 as a lower tier and on to beams 40 as an upper tier which is out of contact with the lower tier. The upper tier of articles is cradled at its ends and is prevented from shifting after once being loaded. This side loading and unloading feature permits laborsaving and rapid handling.

When the primary load is not to be handled, the beams are removed and any suitable supplementary interior siding such as planks, netting or the like, can be fastened to the interior sides of the uprights on the side of the vehicle containing the flexible siding, after which any general purpose cargo may be loaded through the rear door. After the primary cargo is unloaded, the cables 80 and 83 merely hang against the fixed wall 22 and the chain 89 and stretcher 87 lie on the floor of the vehicle, thus giving a substantially unobstructed inner space within the vehicle body for loading therein the intended general purpose cargo.

It will be apparent that various changes and modifications may be made in the described structure without departing from the true spirit and scope of the invention. It, therefore, is intended to cover such modifications and changes within the following claims and to consider the invention as limited only by the scope of those claims.

What is claimed is:

1. A vehicle for enclosing and carrying diverse forms of loads and comprising an elongated flat-bed frame and a mobile support therefor; a rigid roof, a first side wall, a front end wall, a rear door, and a withdrawable flexible siding for covering the side of the vehicle opposite said first side wall; a plurality of pairs of vertical uprights spaced from each other and arranged along the respective sides of said frame and affixed at their respective ends to said frame and to said roof, said first side wall being rigidly fixed to the outer surfaces of the uprights along the side of said frame opposite said flexible siding, a plurality of generally horizontal load-supporting beams, each beam being removably attached at the ends to the corresponding uprights of each pair and at a location intermediate the ends of the uprights, each beam having an angularly flanged rail portion confronting the rail portion of the next adjacent beam and adapted to cradle an article therebetween by contact of the horizontal flange of its rail with the lower end of the article and to prevent endwise shifting of the article by abutment of the end thereof with the upright flange of its rail; the several transverse spaces within said vehicle as defined by each beam and its corresponding pair of uprights and the next adjacent beam and its corresponding pair of uprights being unobstructed and adapted to receive articles moved along said beams from the side of said vehicle opposite said fixed first side wall thereof and to permit the first loaded of such articles to be disposed closely adjacent said first side wall, and the longitudinal space within said vehicle between said fixed first side wall and said flexible siding being unobstructed except for said beams; means attached to said beams for securing articles cradled on said beams against movement transverse of said frame, and means for securing articles resting on said bed against movement transverse of said frame; said vehicle when said flexible siding is withdrawn, being adapted for loading from the side and for employing said beams as load-supporting members, and being adapted for loading from the rear when said beams are detached from said uprights.

2. Apparatus as defined in claim 1 wherein said securing means on said beam comprises a first member permanently attached thereto for preventing movement of articles on said beam in the direction of said first side wall and a second member removably attached thereto for preventing movement of articles on said beam in the direction of said flexible siding.

3. In a side-loading vehicle for carrying articles of generally cylindrical form in multi-tier arrangement, an elongated flat-bed frame and a mobile support therefor, a rigid roof, a first side wall, a front end wall, a rear door, and a withdrawable flexible siding for covering the side of the vehicle opposite said first side wall, a plurality of pairs of vertical uprights spaced from each other and arranged along the respective sides of said frame and affixed at their respective ends to said frame and to said roof, said first side wall being rigidly fixed to the outer surfaces of the uprights along said frame opposite said flexible siding, a plurality of generally horizontal load-supporting beams, each beam attached at the ends to the corresponding uprights of each pair and at a location intermediate the ends of said uprights and at a sufficient height from said bed to provide space for a lower tier of articles similar to the upper tier of articles supported by said beams, each beam having an angularly flanged rail portion confronting the rail portion of the next adjacent beam and adapted to cradle the ends of the upper tier articles therebetween and to prevent endwise shifting of the same; the several transverse spaces within said vehicle for the upper and lower tiers of articles between each beam and its corresponding pair of uprights and the next adjacent beam and its corresponding pair of uprights being unobstructed and adapted to permit the first loaded articles in each tier to be disposed closely adjacent said first side wall, and the longitudinal space within said vehicle between said first side wall and said flexible siding being unobstructed except for said beams; first means removably attached to said beams for securing the upper tier articles against rolling movement, said articles of said upper tier being adapted to roll into and from stowed position on said beams when said first securing means are removed, and second means removably attached to said bed for securing the lower tier articles against rolling movement, said articles of said lower tier being adapted to roll into and from stowed position on said bed when said second securing means are removed.

4. Apparatus as defined in claim 3 wherein the rail portion of each beam includes a horizontal flange bevelled from a minimum width adjacent the upright to which it is attached on the loading side of said vehicle to a maximum width inboard of that upright thereby to avoid damage to the side surface of said articles as they are rolled on and off of said beams.

5. In a side-loading vehicle for carrying articles of generally cylindrical form in multi-tier arrangement and with articles of an upper tier out of contact with articles of the adjacent lower tier, an elongated flat-bed frame and a mobile support therefor, a rigid roof, a first side wall, a front end wall, a rear door, and a withdrawable flexible siding for covering the side of the vehicle opposite said first side wall; a plurality of pairs of vertical uprights spaced from each other and arranged along the respective sides of said frame and affixed at their respective ends to said frame and to said roof, said first side wall being rigidly fixed to the outer surfaces of the uprights along the side of said frame opposite said flexible siding, a plurality of generally horizontal load-supporting beams, each beam being attached at the ends to the corresponding uprights of each pair and at a location intermediate the ends of the uprights and at a sufficient height to provide space for a lower tier of articles similar to the upper tier of articles supported by said beams, each beam having an angularly flanged rail portion confronting the rail portion of the next adjacent beam and adapted to cradle the ends of the upper tier articles therebetween and to prevent endwise shifting of the same, each beam having at least one bifurcated end closely embracing the corresponding upright on which said beam is mounted thereby to add to the rigidity of the assembly; the several transverse spaces within said vehicle for the upper and lower tiers of articles between each beam and its corresponding pair of uprights and the next adjacent beam and its corresponding pair of uprights being unobstructed and adapted to permit the first loaded articles in each tier to be disposed closely adjacent said first side wall and the longitudinal space within said first side wall and said flexible siding being unobstructed except for said beams; means attached to said beams for securing the upper tier articles against rolling movement, and retaining means for jointly securing the articles in each of said upper and lower tiers against rolling movement and including; a cable anchored at its ends to an upper portion of adjacent uprights on the side of the frame opposite the loading side thereof, an anchoring means attached to said frame on the loading side of said vehicle, and tensioning means detachably connecting said cable and said anchoring means thereby to draw said retaining means into contact with the peripheries of the articles in the upper and lower tiers adjacent the loading side of said vehicle when said tensioning means is placed under tension.

References Cited in the file of this patent

UNITED STATES PATENTS

| | | |
|---|---|---|
| 398,714 | Farr | Feb. 26, 1889 |
| 2,222,986 | Parker | Nov. 26, 1940 |
| 2,606,786 | Howard | Aug. 12, 1952 |
| 2,664,307 | Wieland | Dec. 29, 1953 |